(No Model.) 3 Sheets—Sheet 1.

E. THOMSON.
APPARATUS FOR ELECTRIC SOLDERING AND CEMENTING.

No. 423,967. Patented Mar. 25, 1890.

ATTEST:
J. H. Hurdle
W. H. Capel

INVENTOR:
Elihu Thomson
By H. C. Townsend
Attorney (No Model.) 3 Sheets—Sheet 2.
E. THOMSON.
APPARATUS FOR ELECTRIC SOLDERING AND CEMENTING.
No. 423,967. Patented Mar. 25, 1890.
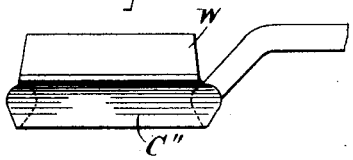
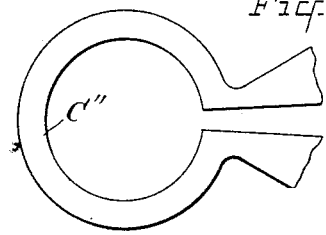
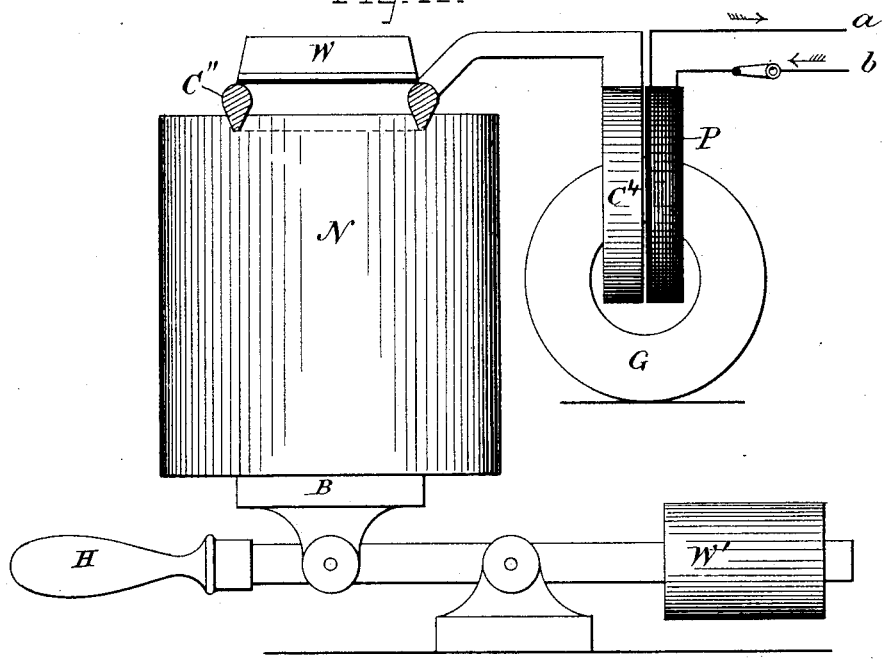
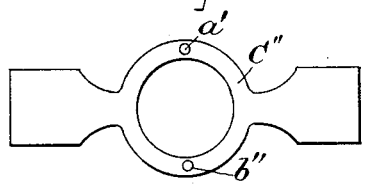
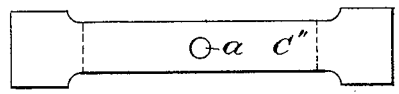
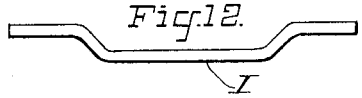
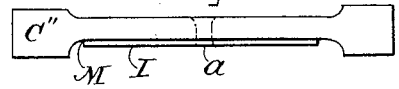
ATTEST:
J. A. Hurdle
Thos. H. Capes
INVENTOR:
Elihu Thomson
By H. C. Townsend
Attorney (No Model.) 3 Sheets—Sheet 3.

E. THOMSON.
APPARATUS FOR ELECTRIC SOLDERING AND CEMENTING.

No. 423,967. Patented Mar. 25, 1890.

ATTEST:
J. A. Hurdle
Wm. H. Capel

INVENTOR:
Elihu Thomson
By H. L. Townsend
Attorney

UNITED STATES PATENT OFFICE.

ELIHU THOMSON, OF LYNN, MASSACHUSETTS.

APPARATUS FOR ELECTRIC SOLDERING AND CEMENTING.

SPECIFICATION forming part of Letters Patent No. 423,967, dated March 25, 1890.

Original application filed August 16, 1889, Serial No. 321,044. Divided and this application filed October 16, 1889. Serial No. 327,238. (No model.)

*To all whom it may concern:*

Be it known that I, ELIHU THOMSON, a citizen of the United States, and a resident of Lynn, in the county of Essex and State of Massachusetts, have invented certain new and useful Apparatus for Electric Soldering, Cementing, &c., of which the following is a specification.

My invention relates to apparatus for employment in those processes of uniting metal or other objects which require the employment of heat to soften or fuse the uniting material that by afterward cooling and becoming set fixes or joins the objects firmly together.

My invention consists in certain apparatus and devices hereinafter more particularly described and claimed, and useful in practicing the method or process described in another application for patent filed by me August 16, 1889, Serial No. 321,044, and consisting, essentially, in heating an electric conductor by a current of large volume and conveying the heat generated therein to the work, which is for that purpose placed in juxtaposition to or contiguous to the conductor.

Figure 2:
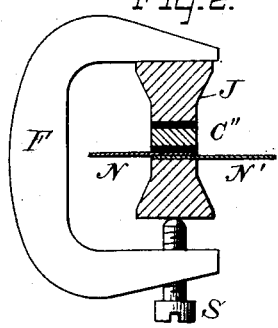
Figure 1:
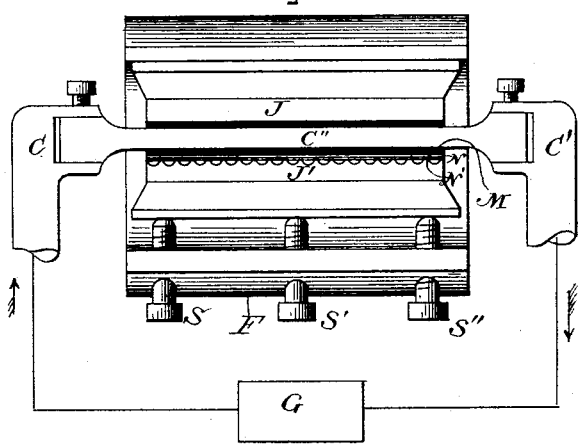
Figure 3:
Figure 4:
Figure 5:
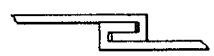
Figure 6:
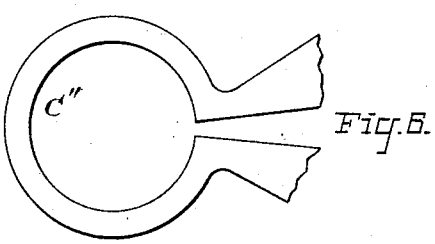
Figure 7:
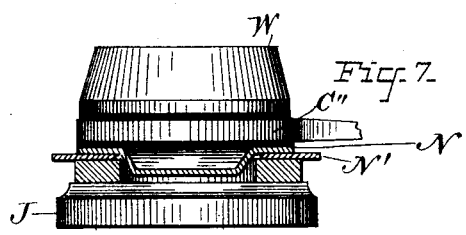
Figure 15:
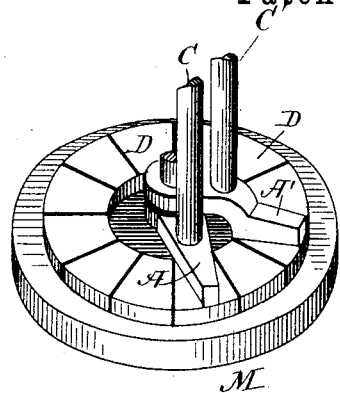
Figure 16:
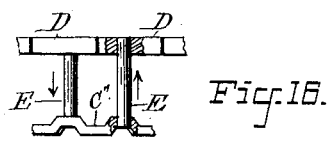
Figure 17:
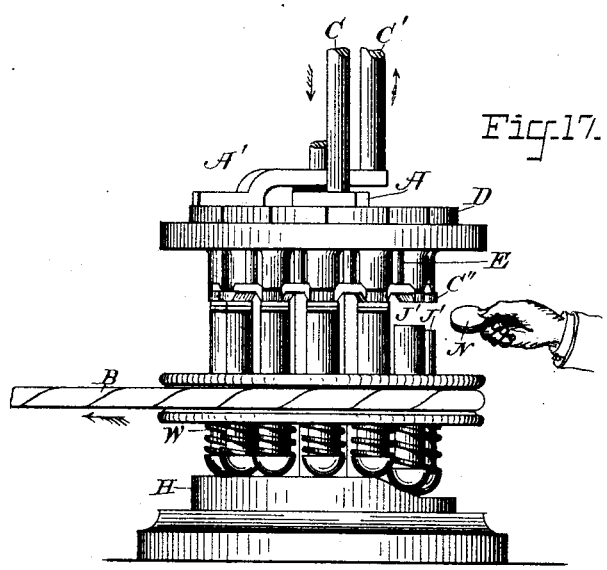

In the accompanying drawings, Figure 1 is a front elevation of a form of device constructed in accordance with my invention. Fig. 2 is a side elevation and vertical section through the same. Figs. 3, 4, and 5 illustrate varieties of work to which my invention is applicable. Fig. 6 shows a particular form of heating-conductor useful in connection with forming circular joints. Fig. 7 is a side elevation of work and apparatus, illustrating the use of the device Fig. 6. Figs. 8, 9, and 10 illustrate apparatus suitable for use in accordance with my invention, Fig. 10 showing the apparatus as applied to the soldering of the cover of a tin can. Fig. 11 shows in plan and Fig. 12 in edge view another form of conductor suitable for forming circular joints and provided with means for electrically insulating it from the work. Figs. 13 and 14 show in plan and edge view another form of conductor provided with an insulated surface and protective face. Fig. 15 shows in perspective a top view of the switch employed in connection with the apparatus shown in Fig. 17 in side elevation. Fig. 16 shows in side elevation and partial section a detail of the construction. Fig. 17 is a side elevation of an apparatus which may be used for rapid work in joining a large number of objects.

Referring to Fig. 1, G indicates a generator of any suitable character adapted to produce or generate electric currents, alternating or continuous, of considerable volume, but of comparatively small electro-motive force, while C C' are heavy electric conductors connecting such source with a conducting plate or rod C'', through which the heavy current is passed for the purpose of heating such conductor C''. The form given to the conductor C'' varies with the form of the work which is subjected to heating by it. J J' are jaws or clamps adapted to hold the work between them and the conductor C''. Under the faces of the heating-conductor C'' a thin layer of some insulating material is preferably applied—such, for instance, as mica. I prefer mica because it is not easily destroyed by heat. The thickness of the layer, as illustrated in the drawings, is somewhat exaggerated. F is a suitable frame for supporting the parts.

In the operation of soldering or tinning together two pieces of metal N N' they are first placed in position between one of the jaws, as J', and the heating-conductor C'', so as to be in juxtaposition to the latter and exposed to the heat from the same when such conductor is heated by the electric current. The current is allowed to traverse the heating-conductor C'' until the pieces N N' have by conduction received from C'' sufficient heat to melt the tin, solder, or other cementing material placed between them at the joint, after which the current is cut off and the work allowed to cool under pressure. Suitable clamping-screws S S' S'' are applied to the jaw or holder J' for the purpose of pressing the work and the heating-conductor into close and firm contiguity. Any other holding or clamping devices might be employed for the purpose. It will be seen that in this operation no part of the current flowing through the conductor C'' passes through the work N N'.

Figs. 3, 4, and 5 illustrate other kinds of joints which may be soldered by the employment of suitably-formed heating-conductors.

In Fig. 4 the pieces to be united by soldering or tinning their surfaces together are at right angles to each other, one part being bent to overlap upon the other. The two pieces might be interlocked, as indicated in Figs. 4 and 5, their heating-surfaces being coated with proper cementing or soldering material, or having such material interposed between them. The conductor C″ might be made circular, as shown in Fig. 6, and would then be adapted to use in applying my process to the soldering together of the bodies and lids of tin cans.

Fig. 7 illustrates the application of the conductor C″ to the formation of a circular joint. N N′ are the two parts to be united, and J the holder or support therefor. The heating-conductor C″ is held in close juxtaposition to the work by means of a suitable weight W.

Fig. 10 shows the apparatus organized for soldering a cover to a tin can. The conductor C″, of the form shown in Fig. 9, is provided with a weight W for holding it down to the work. The conductor C″ is supplied with current from the secondary $C^4$ of the converter or induction-coil, the primary of which (indicated at P) derives alternating or other currents from wires or conductors $a$ $b$. G is the usual mass of iron encircled by the coils of the converter. A tin can N, carried by support B, is pressed up toward the soldering or heating conductors C″ by means of a weight W′. A handle H serves to depress the support when the can is to be removed.

In order to protect the mica insulation on the surface of the conductor from injury, I face it with a thin sheet or piece of metal, such as sheet-iron. (Indicated at I, Figs. 12 and 14.) This facing of iron or metal is applied so that it will not form a path for any of the current flowing in the conductor C″. Thus in Fig. 11 the sheet-iron is riveted to the conductor C″, formed as a circle at the points $a'$ $b'$, which are points of equal potential when the current flows from conductor C to conductor C′ through the ring C″. When the heating-conductor is straight, as in Figs. 13 and 14, the metal facing may be fastened, as indicated at $a'$, to the middle point of the conductor.

In Figs. 15, 16, and 17 I have shown an apparatus that is suitable for use in uniting a large number of objects of the same form or character—such as lids of tin cans—to other bodies. This apparatus is so constructed that one or more pieces are undergoing heating while the others are cooling and the necessary pressure to complete the union is brought to automatically bear upon the work at the proper moment. C C′ are the conductors of large gage, which connect from the source of heating-current and supply-current to terminal blocks A A′, insulated from one another and forming the contacts of a rotary or other switch, the contact-block of which (indicated at D D, &c.,) are carried by a disk that is rotated by means of a belt B. This belt operates on a wheel fixed to the same shaft with the support for the blocks D D. The contact-plates D D are connected by rods E E, of conducting material, with the heating-conductor C″, which is formed, as shown in Figs. 16 and 17, so as to have a number of projecting or heating faces between the rods E E.

J′ J′ indicate a number of clamping-jaws or holders corresponding in position to the heating-faces of the conductor C″ and mounted to spring-actuated followers in the disk, to which belt B is applied. To these followers are applied springs W, that tend to press them down upon a cam-surface H, over which they ride, and which is provided with a depression at a portion of its periphery, so as to permit the jaws J′ to be lowered to receive the parts N to be soldered together. As the followers move around they ride up on the cam and bring the parts into firm contact with the portion of heating-conductor immediately over the jaw. As the jaws or holders rotate with the conductors C″ the part of the latter immediately above the object is brought into position, where it will be included in circuit between the arms A A′ and will be heated, thus holding the soldering or cementing material. As soon as this takes place the continuance of movement carries the part of the heating-conductor in question out of circuit and the cam-surface H maintains the pressure until the soldering or cementing material is cooled, when the revolution having been completed the pieces are released at the depressed portion of the cam. The path of the current is through the arm A, down to the heating-conductor C″ at the part thereof under the arm A, thence to the other conductor A′, and out by conductor C′.

What I claim as my invention is—

1. In an electric soldering or cementing apparatus, a heating electric conductor provided with an insulating-surface where it is applied to the work.

2. In an electric cementing or soldering apparatus, a heating electric conductor having an insulated surface and a protective face of metal.

3. In an electric soldering or cementing apparatus, a circular heating-conductor placed in an electric circuit from any suitable source of electricity.

4. In an electric soldering or cementing apparatus, a circular heating-conductor having its working-surface covered with insulating material, and provided with a metal protective face fastened to the conductor at points of equal potential.

5. In an electric soldering or cementing apparatus, a heating electric conductor faced with mica.

6. In an electric soldering or cementing apparatus, a rotary carrier for the objects to be cemented, provided with a series of jaws or holders, a series of heating conductors or portions of conductor opposite the same, and a rotary electric switch for including such conductors in circuit one after the other.

7. The combination, with the series of clamps or jaws J', carried on a suitable rotary support, of a cam H, upon which they ride, a series of heating-conductors opposite the jaws, and an electric switch for including the same successively in circuit, as and for the purpose described.

Signed at Lynn, in the county of Essex and State of Massachusetts, this 9th day of October, A. D. 1889.

ELIHU THOMSON.

Witnesses:
J. WESLEY GIBBONEY,
A. L. ROHRER.